US008122200B2

(12) United States Patent
Holt

(10) Patent No.: US 8,122,200 B2
(45) Date of Patent: *Feb. 21, 2012

(54) MODIFIED MACHINE ARCHITECTURE WITH ADVANCED SYNCHRONIZATION

(75) Inventor: John M. Holt, Essex (GB)

(73) Assignee: Waratek Pty Ltd., Lindfield, NSW (AU)

(*) Notice: Subject to any disclaimer, the term of this patent is extended or adjusted under 35 U.S.C. 154(b) by 904 days.

This patent is subject to a terminal disclaimer.

(21) Appl. No.: 12/011,218

(22) Filed: Jan. 23, 2008

(65) Prior Publication Data

US 2008/0215701 A1    Sep. 4, 2008

Related U.S. Application Data

(63) Continuation of application No. 11/583,961, filed on Oct. 18, 2006, now Pat. No. 7,761,670.

(60) Provisional application No. 60/730,493, filed on Oct. 25, 2005.

(51) Int. Cl.
*G06F 12/00* (2006.01)

(52) U.S. Cl. ............................. 711/152; 711/114; 712/28

(58) Field of Classification Search ........................ None
See application file for complete search history.

(56) References Cited

U.S. PATENT DOCUMENTS

| | | | |
|---|---|---|---|
| 4,969,092 A | 11/1990 | Shorter | |
| 5,214,776 A | 5/1993 | Bagnoli et al. | |
| 5,291,597 A | 3/1994 | Shorter | |
| 5,418,966 A | 5/1995 | Madduri | |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,609 A | 10/1996 | Sugiyama et al. | |
| 5,612,865 A | 3/1997 | Dasgupta | |
| 5,802,585 A | 9/1998 | Scales et al. | |

(Continued)

FOREIGN PATENT DOCUMENTS

EP    0969377    1/2000

(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner* — Shawn X Gu
(74) *Attorney, Agent, or Firm* — Pillsbury Winthrop Shaw Pittman LLP

(57) ABSTRACT

A multiple computer environment is disclosed in which an application program executes simultaneously on a plurality of computers (M1, M2, . . . Mn) interconnected by a communications network (53) and in which the local memory of each computer is maintained substantially the same by updating in due course. A lock mechanism is provided to permit exclusive access to an asset, object, or structure (ie memory location) by acquisition and release of the lock. In particular, before a new lock can be acquired by any other computer on a memory location previously locked by one computer, any re-written content(s) for the previously locked memory location are transmitted to all the other computers and their corresponding memory locations (before the in due course updating). Thus when the new lock is acquired all the corresponding memory locations of all computers have been updated.

47 Claims, 6 Drawing Sheets

U.S. PATENT DOCUMENTS

| | | | |
|---|---|---|---|
| 5,918,248 A | 6/1999 | Newell et al. | |
| 6,049,809 A | 4/2000 | Raman et al. | |
| 6,148,377 A * | 11/2000 | Carter et al. | 711/147 |
| 6,163,801 A | 12/2000 | O'Donnell et al. | |
| 6,192,514 B1 | 2/2001 | Lurndal | |
| 6,314,558 B1 | 11/2001 | Angel et al. | |
| 6,324,587 B1 * | 11/2001 | Trenbeath et al. | 719/310 |
| 6,327,630 B1 | 12/2001 | Carroll et al. | |
| 6,370,625 B1 | 4/2002 | Carmean et al. | |
| 6,389,423 B1 | 5/2002 | Sakakura | |
| 6,425,016 B1 | 7/2002 | Banavar et al. | |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,611,955 B1 | 8/2003 | Logean et al. | |
| 6,625,751 B1 | 9/2003 | Starovic et al. | |
| 6,668,260 B2 | 12/2003 | Zoltan | |
| 6,757,896 B1 | 6/2004 | Cohen et al. | |
| 6,760,903 B1 | 7/2004 | Morshed et al. | |
| 6,775,831 B1 | 8/2004 | Carrasco et al. | |
| 6,779,093 B1 | 8/2004 | Gupta | |
| 6,782,492 B1 | 8/2004 | Nakaso | |
| 6,823,511 B1 * | 11/2004 | McKenney et al. | 718/102 |
| 6,862,608 B2 | 3/2005 | Buhlman et al. | |
| 6,954,794 B2 | 10/2005 | Rudd et al. | |
| 6,968,372 B1 | 11/2005 | Thompson et al. | |
| 7,010,576 B2 | 3/2006 | Bae | |
| 7,020,736 B1 | 3/2006 | Cherukuri | |
| 7,031,989 B2 | 4/2006 | Elmendorf et al. | |
| 7,047,341 B2 | 5/2006 | Jung | |
| 7,047,521 B2 | 5/2006 | Bunnell | |
| 7,058,826 B2 | 6/2006 | Fung | |
| 7,082,604 B2 | 7/2006 | Schneiderman | |
| 7,206,827 B2 | 4/2007 | Viswanath et al. | |
| 7,761,670 B2 * | 7/2010 | Holt | 711/152 |
| 2002/0199172 A1 | 12/2002 | Bunnel | |
| 2003/0004924 A1 | 1/2003 | Williams | |
| 2003/0005407 A1 | 1/2003 | Hines | |
| 2003/0067912 A1 | 4/2003 | Mead et al. | |
| 2003/0105816 A1 | 6/2003 | Goswami | |
| 2004/0073828 A1 | 4/2004 | Bronstein | |
| 2004/0093588 A1 | 5/2004 | Gschwind et al. | |
| 2004/0158819 A1 | 8/2004 | Cuomo et al. | |
| 2004/0163077 A1 | 8/2004 | Dimpsey et al. | |
| 2005/0039171 A1 | 2/2005 | Avakian et al. | |
| 2005/0086384 A1 | 4/2005 | Ernst | |
| 2005/0108481 A1 | 5/2005 | Iyengar et al. | |
| 2005/0240737 A1 | 10/2005 | Holt | |
| 2005/0257219 A1 | 11/2005 | Holt | |
| 2005/0262313 A1 | 11/2005 | Holt | |
| 2005/0262513 A1 | 11/2005 | Holt | |
| 2006/0020913 A1 | 1/2006 | Holt | |
| 2006/0080389 A1 | 4/2006 | Powers et al. | |
| 2006/0095483 A1 | 5/2006 | Holt | |
| 2006/0143350 A1 | 6/2006 | Miloushev et al. | |
| 2006/0167878 A1 | 7/2006 | Hartman | |
| 2006/0242464 A1 | 10/2006 | Holt | |
| 2006/0253844 A1 | 11/2006 | Holt | |
| 2006/0265703 A1 | 11/2006 | Holt | |
| 2006/0265704 A1 | 11/2006 | Holt | |
| 2006/0265705 A1 | 11/2006 | Holt | |
| 2008/0072238 A1 | 3/2008 | Monnie et al. | |
| 2008/0189700 A1 | 8/2008 | Schmidt et al. | |

FOREIGN PATENT DOCUMENTS

| | | |
|---|---|---|
| WO | WO95/08809 | 3/1995 |
| WO | WO98/58330 | 12/1998 |
| WO | WO02/44835 | 6/2002 |
| WO | WO03/083614 | 10/2003 |
| WO | WO03/084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal et al., "Experience with Distributed Programming in Orca", Proc. IEEE CS International Conference on Computer Languages, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems", IEEE Transactions on Software Engineering, 18(3):190-205 (2002).

Bal et al., "Replication Techniques for Speeding up Parallel Applications on Distributed Sysytems", Concurrency Practice & Experience, 4(5):337-355 (1992).

Bressoud, T.C. TFT: "A Software System for Application-Transparent Fault Tolerance. Proc.", 28th Annual International Symposium on Fault-Tolerant Computing, pp. 128-137 (1998).

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", IEEE CS International Conference on Computer Languages, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", IEEE Transactions on Software Engineering, 18(3): pp. 1-33, Oct. 1989.

Bal, et al., "Replication Techniques for Speeding Up Parallel Applications on Distributed Systems", Concurrency Practice & Experience, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28th Annual International Symposium on Fault-Tolerant Computing, pp. 128-137, Jun. 1998, Munich, Germany.

Chen, et al., "Multi-Jay: a distributed shared memory system based on multiple Java virtual machines." Proc. Of Conf on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System Darts." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5-Retreived from the internet URL:http//www.springerlink.com/content/5v028411810p6m700/>, vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/{veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplemental EP Search Report of EP Appl. No. 06790317 dated Mar. 18, 2009 (6 pages).

* cited by examiner

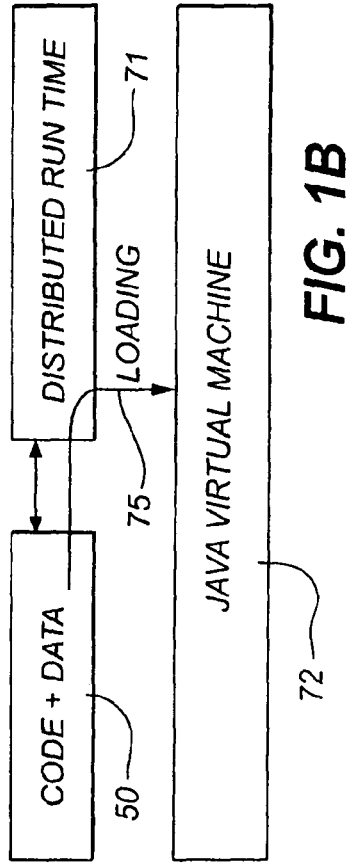
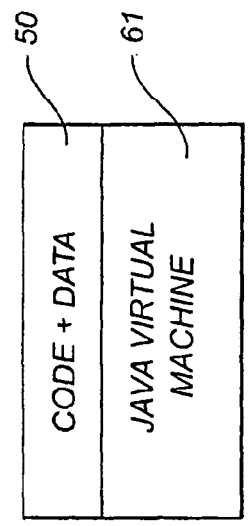
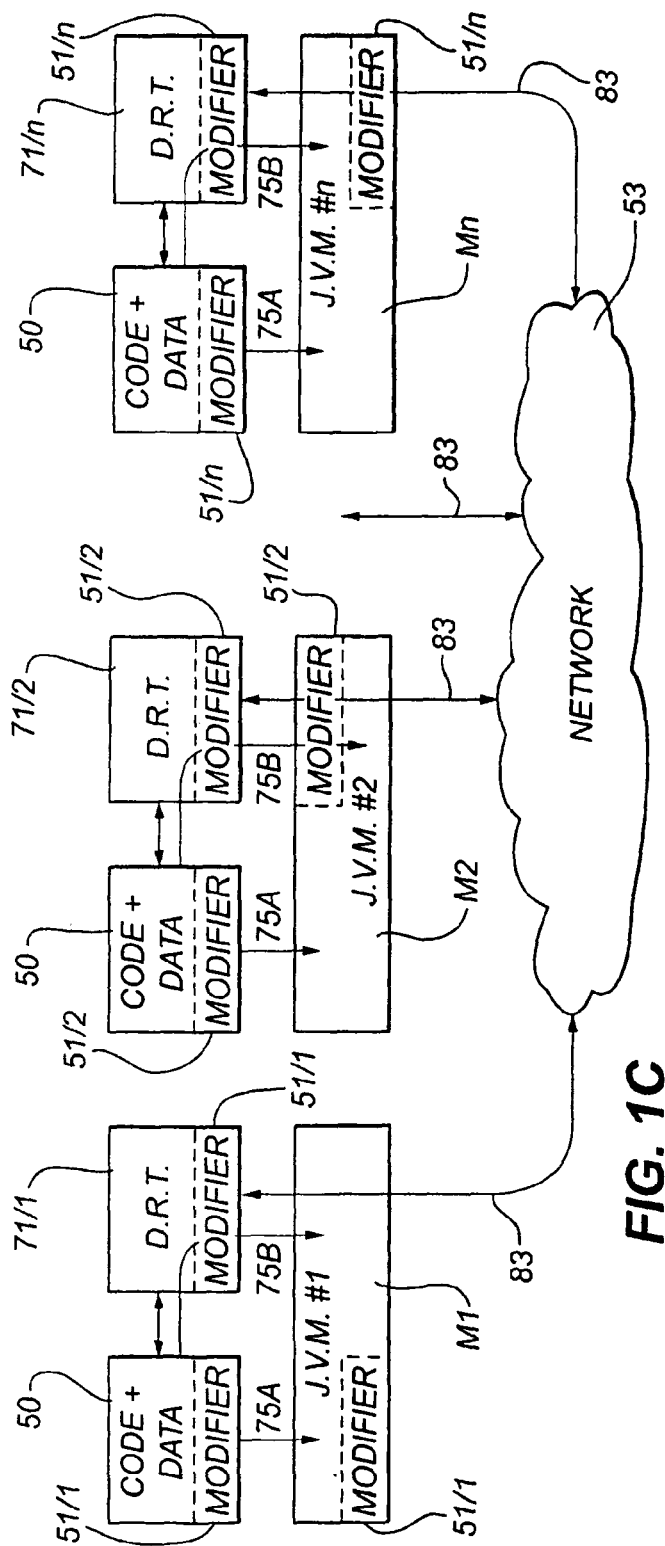

MODIFIED MACHINE ARCHITECTURE WITH ADVANCED SYNCHRONIZATION

CROSS-REFERENCE TO RELATED APPLICATIONS

This application is a continuation application that claims benefit under 35 USC 120 to U.S. application Ser. No. 11/583,961 filed Oct. 18, 2006, now issued as U.S. Pat. No. 7,761,670 and entitled "Modified Machine Architecture With Advanced Synchronization," and claims benefit under 35 USC 119(e) to U.S. Provisional Application No. 60/730,493 entitled "Modified Machine Architecture with Advanced Synchronization" filed 25 Oct. 2005; which is hereby incorporated by reference.

FIELD OF THE INVENTION

The present invention relates to computing and, in particular, to the simultaneous operation of a plurality of computers interconnected via a communications network.

BACKGROUND ART

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Application Nos. PCT/AU2005/001641 to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 in the name of the present applicant and unpublished as at the priority date of the present application, also disclose further details. The contents of each of the abovementioned prior application(s) are hereby incorporated into the present application by cross reference for all purposes.

Briefly stated, the abovementioned patent specifications disclose that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, there are situations in which the use of stale contents or values instead of the latest content can create problems.

The genesis of the present invention is a desire to at least partially overcome the abovementioned difficulty.

SUMMARY OF THE INVENTION

In accordance with a first aspect of the present invention there is disclosed in a multiple computer environment in which different portions of at least one application program each written to execute on only a single computer, each execute substantially simultaneously on a corresponding one of a plurality of computers, each having a local memory and each being interconnected via a communications network, and in which at least one memory location is replicated in the memory of each said plurality of computers, and after each occasion at which each said memory location has its contents written to, or re-written, with a new content, all said corresponding memory locations of said computers are in due course updated via said communications network with said new content, the further improvement comprising the steps of:

(i) prior to initially writing said new content, acquiring a lock on an object, asset or resource, (ii) recording the name and updated content of said local memory locations written to prior to releasing said lock, (iii) releasing said lock, and (iv) prior to permitting the acquisition of the same lock by another one of said computers, transmitting said updated memory location(s) and updated content(s) to said another one computer, whereby any said computer on acquiring said lock has acquired said previously updated contents without needing to wait for said in due course updating of all said computers.

In accordance with a second aspect of the present invention there is disclosed a computer system comprising a plurality of computers each having a local memory and each being interconnected via a communications network wherein different portions of at least one application program each written to execute on only a single computer, each execute substantially simultaneously on a corresponding one of said plurality of computers, at least one memory location is replicated in the local memory of each said computer, said system further comprising updating means associated with each said computer to in due course update each said memory location via said communications network after each occasion at which each said memory location has its content written to, or re-written, with a new content, and lock means associated with each said computer to acquire a lock on an object, asset or resource, said lock means including a recording means in which is recorded the name and updated content of all said local memory locations written to prior to releasing said lock, and said lock means after releasing said lock and prior to permitting the acquisition of the same lock by another one of said computers transmitting said updated memory location(s) and updated content(s) to said another one computer, whereby any said computer on acquiring said lock has acquired said previously updated contents without needing to wait for said in due course updating of all said computers.

In accordance with a third aspect of the present invention there is disclosed a single computer intended to operate in a multiple computer system which comprises a plurality of computers each having a local memory and each being interconnected via a communications network wherein different portions of at least one application program each written to execute on only a single computer, each execute substantially simultaneously on a corresponding one of said plurality of computers, and at least one memory location is replicated in the local memory of each said computer, said system further comprising updating means associated with each said computer to in due course update each said memory location via said communications network after each occasion at which each said memory location has its content written to, or re-written, with a new content, said single computer comprising:

a local memory having at least one memory location intended to be updated via a communications port connectable to said communications network, updating means to in due course update the memory locations of other substantially similar computers via said communications port;

lock means associated with said local memory to acquire a lock on an object, asset or resource of said local memory, said lock means including a recording means in which is recorded the name and updated content of said local memory locations written to prior to releasing said lock, and said lock means after releasing said lock and prior to permitting the acquisition of the same lock by another one of said computers, transferring said updated memory location(s) and updated content(s) to said communications port for transmittal to said another one computer whereby any said another one computer on acquiring said lock has acquired said previously updated contents without needing to wait for said in due course updating of all said computers.

In accordance with a fourth aspect of the present invention there is disclosed in a single computer, adapted to interoperate with a plurality of other external computers as a multiple computer system wherein said computer has a local processor and a local memory coupled to the local processor and said computers are at least intermittently interconnected via a communications network, and wherein different portions of an application program written to execute on only a one computer are modified to execute substantially simultaneously on said single computer and said plurality of computers, and wherein at least one memory location is replicated in the local memory of each said computer, each said computer including memory location updating means to in due course update each said memory location via said communications network after each occasion at which each said memory location has its content written to, or re-written, with a new content; a method comprising:

acquiring a lock on an object, asset, or resource of said local memory of said single computer prior to initially writing said new content;

recording the name and updated content of said at least one local memory location of said single computer written to prior to releasing said lock;

releasing said lock on said object, asset, or resource of said local memory of said single computer; and sending a communication of said updated memory location(s) and updated content(s) to other of said plurality of computers by said single computer over said communications network.

In accordance with a fifth aspect of the present invention there is disclosed in a single computer, adapted to interoperate with a plurality of other external computers as a multiple computer system wherein said computer has a local processor and a local memory coupled to the local processor and said computers are at least intermittently interconnected via a communications network, and wherein different portions of an application program written to execute on only a one computer are modified to execute substantially simulta-neously on said single computer and said plurality of computers, and wherein at least one memory location is replicated in the local memory of each said computer, each said computer including memory location updating means to in due course update each said memory location via said communications network after each occasion at which each said memory location has its content written to, or re-written, with a new content; a method comprising:

receiving a communication of updated memory location(s) and updated content(s) to send by a different one of said plurality of computers by said single computer over said communications network; and updating the local memory locations of said single computer in response to said received communication.

In accordance with a sixth aspect of the present invention there is disclosed a plurality of computers interconnected via a communications network and operable to ensure carrying out any of the above methods.

In accordance with a seventh aspect of the present invention there is disclosed a computer program product comprising a set of program instructions stored in a storage medium and operable to permit a plurality of computers to carry out any of the above methods.

BRIEF DESCRIPTION OF THE DRAWINGS

A preferred embodiment of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a synchronizing lock server.

DETAILED DESCRIPTION

Figure 2:
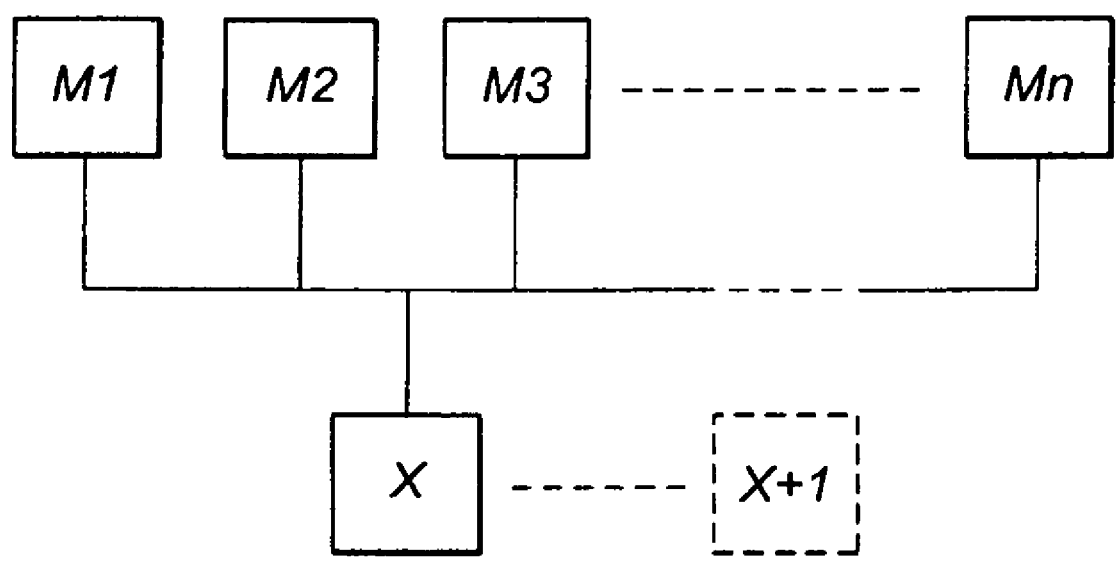

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system (or equivalent control software or other mechanism) operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine. For further details, see "The JAVA Virtual Machine Specification" 2$^{nd}$ Edition by T. Lindholm and F. Yellin of Sun Microsystems Inc of the USA which is incorporated herein by reference.

This conventional art arrangement of FIG. 1A is modified in accordance with embodiments of the present invention by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. A runtime system (whether a distributed runtime system or not) typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written to execute on a single machine or computer (or to operate on the multiple computer system of the abovementioned patent applications which emulate single computer operation). Essentially the modified structure is to replicate an identical memory structure and contents on each of the individual machines.

The term "common application program" is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing embodiments of the invention may optionally be connected to or coupled with other computers, machines, information appliances, or the like that do not implement embodiments of the invention.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the application code on each machine. Some dissimilarity between the programs or application codes on the different machines may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 ... Mn operates with the same (or substantially the same or similar) modifier 51 (in some embodiments implemented as a distributed run time or DRT71 and in other embodiments implemented as an adjunct to the application code and data 50, and also able to be implemented within the JAVA virtual machine itself). Thus all of the machines M1, M2 ... Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example, as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. These functions or operations may be implemented in a variety of ways, and it will be appreciated in light of the description provided herein that exactly how these functions or operations are implemented or divided between structural and/or procedural elements, or between computer program code or data structures, is not important or crucial to the invention.

However, in the arrangement illustrated in FIG. 1C, a plurality of individual computers or machines M1, M2 ... Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including ETHERNET or INFINIBAND and extensions and improvements, thereto. Preferably, the computers are provided with one or more known communications ports (such as CISCO Power Connect 5224 Switches) which connect with the communications network 53.

As a consequence of the above described arrangement, if each of the machines M1, M2, ..., Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 ... Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 ... Mn has a private (i.e. 'non-common') internal memory capability. The private internal memory capability of the machines M1, M2, ..., Mn are normally approximately equal but need not be. For example, when a multiple computer system is implemented or organized using existing computers, machines, or information appliances, owned or operated by different entities, the internal memory capabilities may be quite different. On the other hand, if a new multiple computer system is being implemented, each machine or computer is preferably selected to have an identical internal memory capability, but this need not be so.

It is to be understood that the independent local memory of each machine represents only that part of the machine's total memory which is allocated to that portion of the application program running on that machine. Thus, other memory will be occupied by the machine's operating system and other computational tasks unrelated to the application program 50.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, ..., Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple processors (eg symmetric multiple processors or SMPs) or multiple core processors (eg dual core processors and chip multithreading processors) manufactured by Intel, AMD, or others, or implemented on a single printed circuit board or even within a single chip or chip set. Similarly, also included are computers or machines having multiple cores, multiple CPU's or other processing logic.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine or processor manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products-made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

This analysis or scrutiny of the application code 50 can take place either prior to loading the application program code 50, or during the application program code 50 loading procedure, or even after the application program code 50 loading procedure (or some combination of these). It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one embodiment, the analysis or scrutiny of the application code 50 takes place during the loading of the application program code such as by the operating system reading the application code 50 from the hard disk or other storage device, medium or source and copying it into memory and preparing to begin execution of the application program code. In another embodiment, in a JAVA virtual machine, the analysis or scrutiny may take place during the class loading procedure of the java.lang.Class-Loader.loadClass method, (e.g. "java.lang.ClassLoader.load-Class( )").

Alternatively, or additionally, the analysis or scrutiny of the application code 50 (or of a portion of the application code) may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means and/or methods.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

The DRT 71 or other code modifying means is responsible for creating or replicating a memory structure and contents on each of the individual machines M1, M2 . . . Mn that permits the plurality of machines to interoperate. In some embodiments this replicated memory structure will be identical. Whilst in other embodiments this memory structure will have portions that are identical and other portions that are not. In still other embodiments the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine typically takes place via the network interconnecting the machines. Thus, the local memory of each machine is able to be accessed by any other machine and can therefore cannot be said to be independent. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine (given contemporary processor speeds). Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes. Also, the local memory of each machine is not able to be accessed by any other machine and can therefore be said to be independent.

The invention is transport, network, and communications path independent, and does not depend on how the communication between machines or DRTs takes place. In one embodiment, even electronic mail (email) exchanges between machines or DRTs may suffice for the communications.

In connection with the above, it will be seen from FIG. 2 that there are a number of machines M1, M2, . . . Mn, "n" being an integer greater than or equal to two, on which the application program 50 of FIG. 1 is being run substantially simultaneously. These machines are allocated a number 1, 2, 3, . . . etc. in a hierarchical order. This order is normally looped or closed so that whilst machines 2 and 3 are hierarchically adjacent, so too are machines "n" and 1. There is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the present invention, if desired. However this would result in generally undesirable complexity. If the machine X is not provided then its functions, such as housekeeping functions, are provided by one, or some, or all of the other machines.

Figure 3:
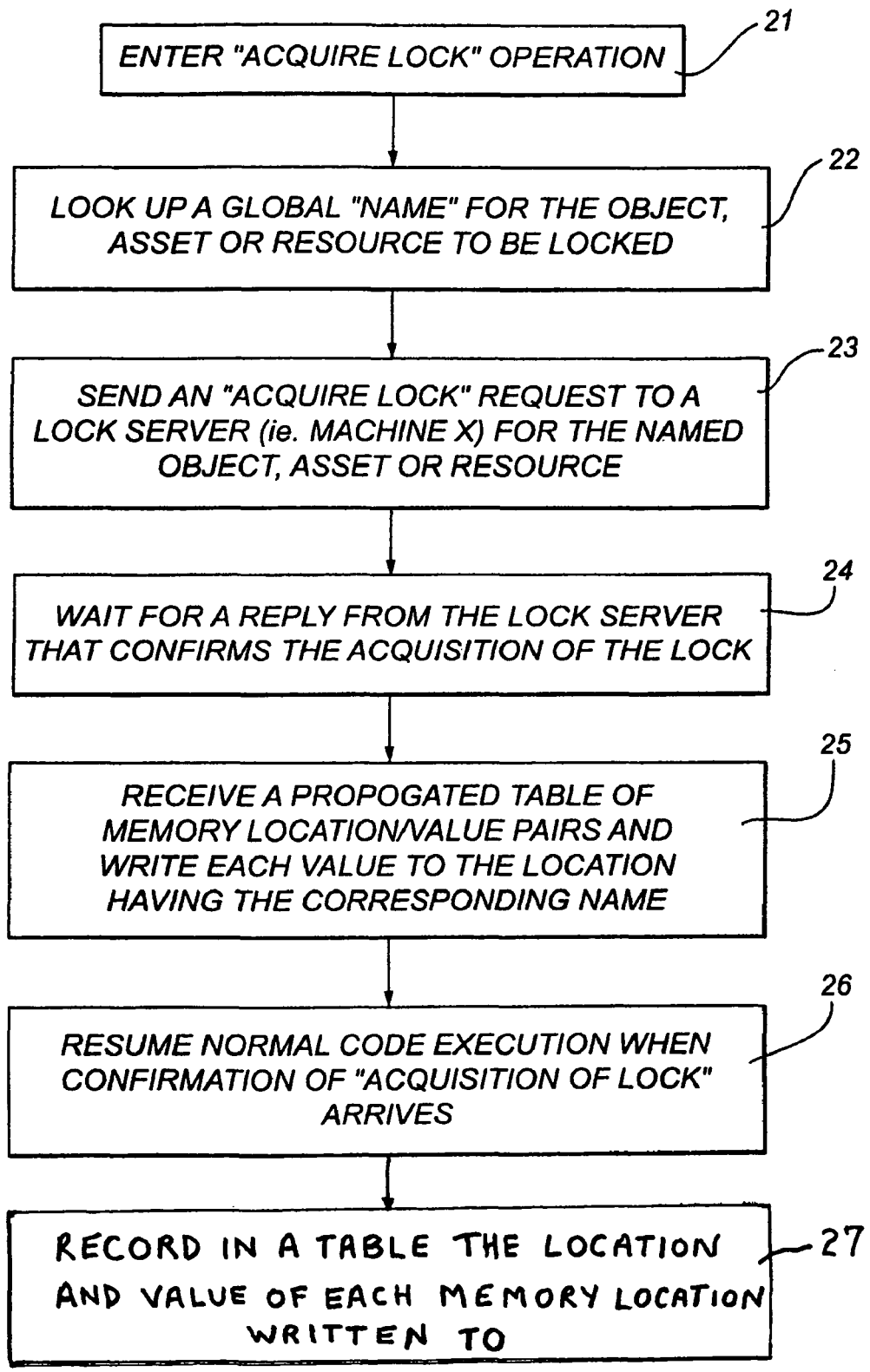
FIGS. 3 and 4 are flowcharts respectively illustrating the acquire lock and release lock procedures of a first embodiment.

Turning now to FIG. 3, the operation of one of the machines M1-Mn on acquiring a lock is illustrated. During normal code execution, the need for a lock arises and thus upon entering the "acquire lock" operation, as indicated at step 21, the acquiring machine, say M5, which is to acquire the lock looks up a global name for the object, asset or resource to be locked. For the purposes of this example, it will be assumed that the object asset or resource is an object. Thus at step 22, the global name of the object is looked up, bearing in mind that each of the machines M1-Mn has a local object which corresponds to the same object in each machine, but which will have the same global name, but possibly a different local name depending upon the organisation of the local memory of each machine.

The global names and the corresponding local memory names or addresses are preferably stored in a table or similar data structure. The table can be presented in each of the "n" machines or in server machine X only. The data structure can take the form of a tag which accompanies each local memory location and which identifies or points to, or refers to the global name. Conversely, the global name can identify, point to, or refer to the local memory location, or object, asset, etc.

Once this global name has been ascertained by machine M5, machine M5 then sends an "acquire lock" request to the machine X, which functions as the lock server. This is indicated in step 23. As indicated in step 24, machine M5 then awaits a reply from the lock server, which confirms the acquisition of the lock.

For the purposes of explanation, it is convenient to assume that the lock thus acquired is the first lock on the object. As a consequence, machine M5 only carries out steps 21-24 and step 25 will result in receipt of a table with nil values. Machine M5 then proceeds to resume normal code execution. As indicated in step 27, each time a memory location is written to, an entry is made in a table with the name of the memory location and the amended value. As a consequence, when the lock is about to be relinquished, there is in existence a table, which lists the memory location(s) and value(s) of each memory location, where a value has been written to memory. Thus, when a lock acquired is not the first lock on an object, as indicated in step 25, on the acquisition of that subsequent lock, each machine receives a table with the updated memory values and global names to which the lock relates. This procedure is repeated for each lock.

The above described operation of FIG. 3 can be modified slightly due to possible delays in transmission within the communications network 53. This can result in the confirmation of "acquisition of lock" of step 26 being received before the table of memory location/value pairs of step 25. In these circumstances normal code execution resumes after the receipt of the table of step 25.

Figure 4:
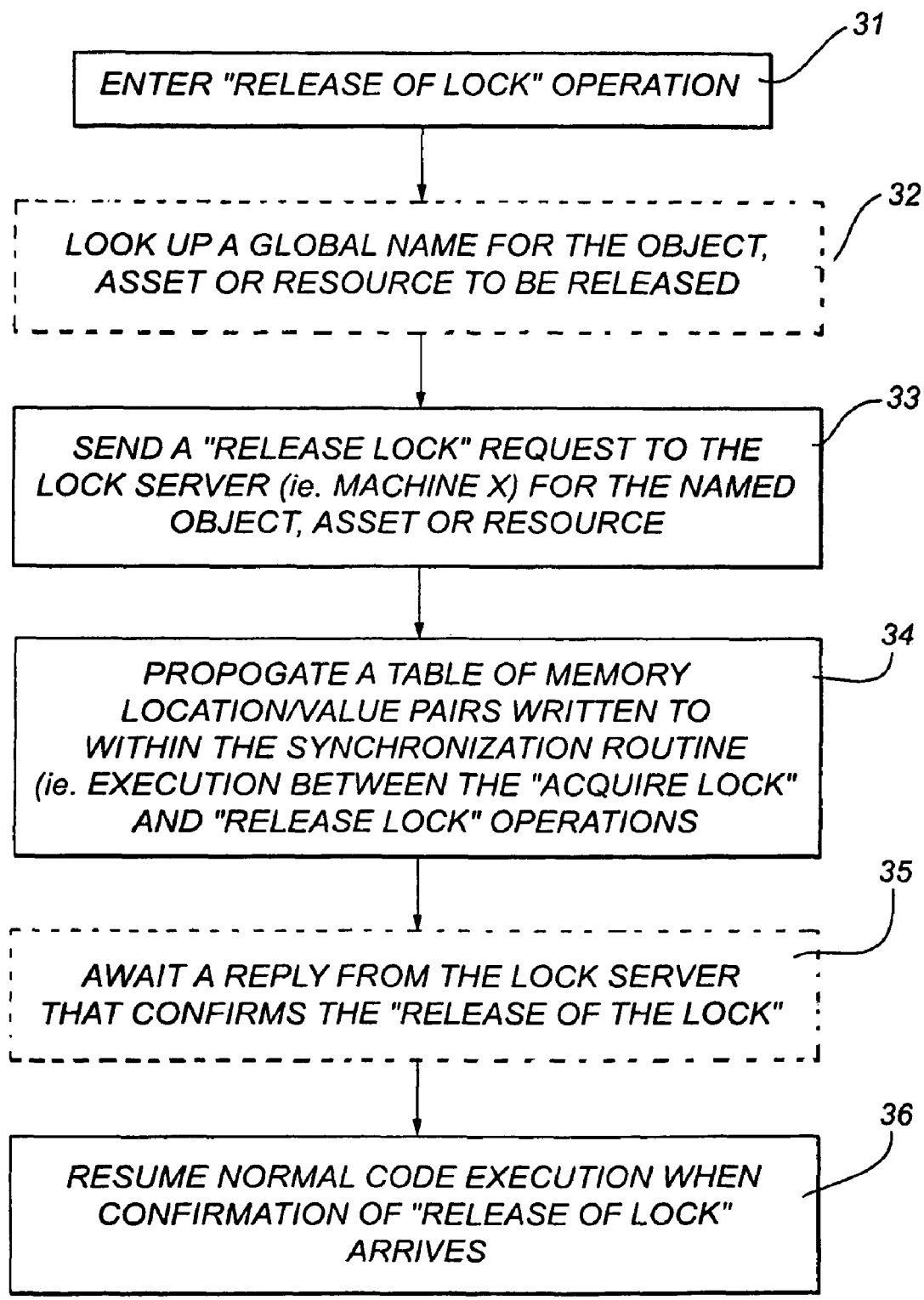

Similarly, as indicated in FIG. 4, where a lock is intended to be released or relinquished, as indicated at step 31 then the relinquishing machine, M5, preferably determines the global name of the object to be unlocked. This is indicated at step 32. Next the relinquishing machine, M5 sends a "release lock" request to the lock server machine X and this is indicated at step 33. The lock server machine X sends to the requesting machine, not only the lock authorization, but also propagates the previously generated table contents (ie memory location/value pairs) created whilst the lock was held by machine M5. Preferably as indicated at step 35, the machine M5 awaits a reply from a lock server, which confirms the release of the lock. This step 35, like step 32, is a preferable one, but not essential and thus is indicated in broken lines in FIG. 4. Next, as indicated at step 36, the machine M5 resumes normal code execution.

The abovementioned procedure for lock acquisition and release, can be modified so as to reduce the volume of data contained within the table to be propagated from one machine to the other. In particular, the abovementioned procedure suffers from the disadvantage that where a specific memory location is written to on many occasions, each of the successive values is stored within the table, but it is only the final value which is of interest to the next machine to receive the lock. In order to reduce the volume of data sent with each table, the above-mentioned procedure can be modified by noting only the names of the various locations, which had been written to, during the duration of the lock. Only at the relinquishing of the lock, is the current value of each memory location read and then inserted into the table or then used to form a new table.

Irrespective of which method is used, the lock authorization and its accompanying table of memory locations/content pairs are preferably given top priority for transmission via the communications network 53. As a consequence, the machine in the queue of waiting machines which receives the lock receives not only the lock authorization, but also the global names of the relevant written to memory locations, together with their up-to-date values or content.

Figure 5:
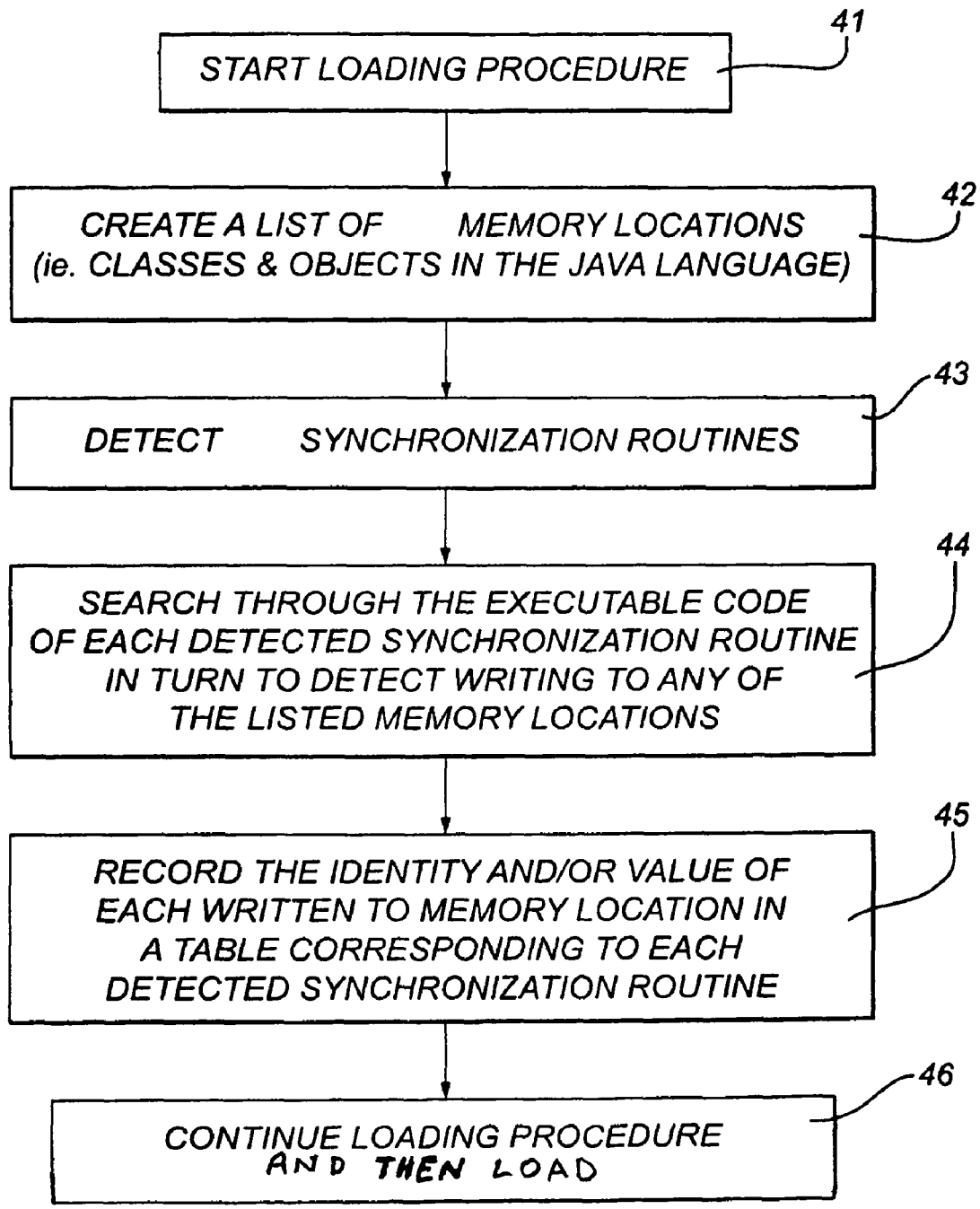
FIGS. 5 and 6 are flowcharts illustrating the respective procedures of a second embodiment.
Figure 6:
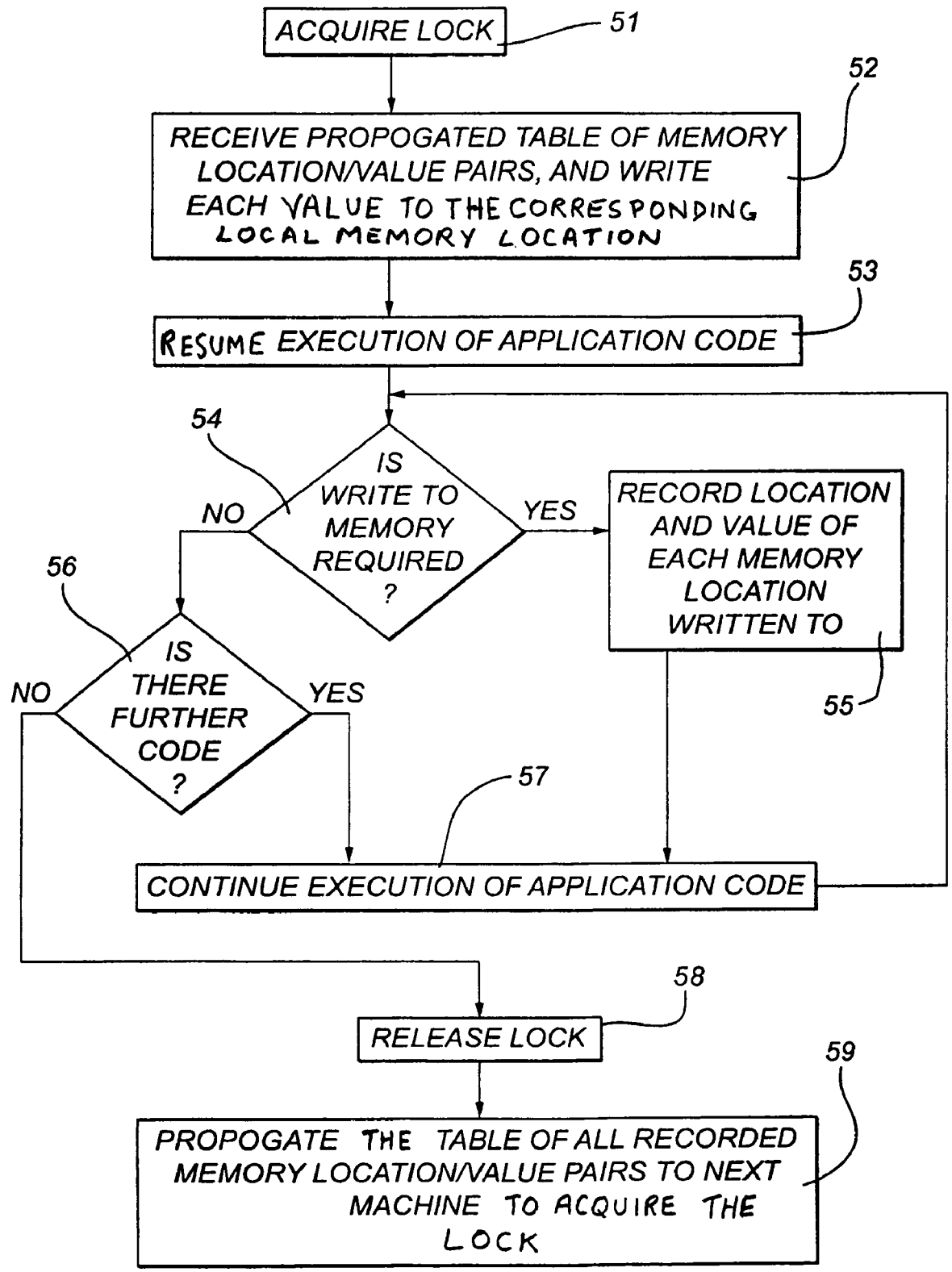

An alternative arrangement is illustrated in FIGS. 5 and 6. Here, during the initial loading of the application program, after commencing the loading procedure at step 41, step 42 is carried out so as to create a list of memory locations to be utilised by the application program. Next, as indicated in step 43, a search of the program is conducted in order to detect synchronisation routines. Then, as indicated in step 44, for each detected synchronisation routine, a search is made to detect any listed memory locations which are to be written to.

In step 45, a table is created (either during the search or during execution of the application program) in which is recorded the identity and value (if all changes to each memory location are to be propagated) or just the identity of each memory location (if the final value of each memory location is to be propagated). Once this procedure has been completed in step 45, the loading procedure continues as indicated at step 46 and the modified application program is loaded.

In FIG. 6, the procedure of acquiring and relinquishing a lock, where the above-mentioned modification of the program has been carried out at loading, is illustrated. As indicated at step 52, once the lock is acquired, the machine acquiring the (subsequent) lock also receives the propagated table of memory location/value pairs. In order to ensure that the local memory location(s) corresponding to the global name(s) has the latest content or value, the machine acquiring the lock updates its local memory. The machine which has acquired the lock is thus in a position to begin execution of the application code with a local memory which is in the condition applying when the previous lock was released. This is indicated at step 53.

During the execution of the application code, as indicated by steps 54 and 55, if any write to memory is to take place, then the location and value of each memory location written to, is recorded in a table. This cycle repeats as necessary, also utilizing steps 56 and 57. After this has been carried out, as indicated at step 56, if there is no further code to be executed within the synchronization routine, then the lock is released as indicated by step 58. As indicated by step 59, at the release of the lock a table is propagated to the machine to next receive the lock in any queue of waiting machines, the table containing all recorded memory location/value pairs where any writing to memory occurred whilst the lock was held by the releasing machine.

The tabulation or recording of memory location/value pairs can be accomplished in various ways. In one form a single table is used for all purposes. In another form one table is used to record the newly written values and a record table is used to record the memory location/value pairs. This second table is transmitted when the lock is released. For example the table in steps 52 and 55 and 59 can be same table or different tables can be used. Alternatively, the table of steps 52 and 59 can be the same table and the table of step 55 can be a different table. Many tabulation formats will be apparent to those skilled in the computing arts. What is important is the nature and content of the tabulated or recorded data, not the tabulation format.

In connection with the foregoing, where reference is made to searching for synchronization routines and written to memory locations, it will be apparent to those skilled in the art that it is routines and locations within the application program 50 which are searched or detected. It is not the entirety of the memory of each machine (which includes an operating system, for example) which is searched.

Set out in an Annexure hereto are code fragments G1-G32 which exemplify the implementation of the above described techniques. Such code fragments are written in the JAVA language.

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . Mn. For example, rather than having to keep track of each unique local name or identity of each similar equivalent local object on each machine of the plurality of similar equivalent objects, one may instead define or use a global name corresponding to the plurality of similar equivalent objects on each machine (e.g. "globalname7787"), and with the understanding that each machine relates the global name to a specific local name or object (e.g. "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (e.g. memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

The term "table" or "tabulation" as used herein is intended to embrace any list or organised data structure of whatever format and within which data can be stored and read out in an ordered fashion.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) a pre-compilation procedure prior to loading,
(iii) compilation prior to loading,
(iv) "just-in-time" compilation(s), or
(v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Given the fundamental concept of modifying memory manipulation operations to coordinate operation between and amongst a plurality of machines M1, M2 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3 . . . Mn (either sequentially or simultaneously or according to any other order, routine or procedure) with the modified object (or class or other assert or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is executable intermediary code.

In this arrangement, which may be termed "master/slave" each of the slave (or secondary) machines M1, M3 . . . Mn loads the modified object (or class), and inclusive of the new modified memory manipulation operation(s), that was sent to it over the computer communications network or other communications link or path by the master (or primary) machine, such as machine M2, or some other machine as a machine X. In a slight variation of this "master/slave" or "primary/secondary" arrangement, the computer communications network can be replaced by a shared storage device such as a shared file system, or a shared document/file repository such as a shared database.

It will be appreciated in the light of the detailed description provided herein that the modification performed on each machine or computer need not and frequently will not be the same or identical. What is required is that they are modified in a similar enough way that each of the plurality of machines behaves consistently and coherently relative to the other machines. Furthermore, it will be appreciated that there are a myriad of ways to implement the modifications that may for example depend on the particular hardware, architecture, operating system, application program code, or the like or different factors. It will also be appreciated that implementation can be within an operating system, outside of or without the benefit of any operating system, inside the virtual machine, in an EPROM, in software, in hardware, in firmware, or in any combination of these.

In a still further embodiment, each machine M1, M2 . . . Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different. It can thereby be enhanced, customized, and/or optimized based upon its particular machine architecture, hardware processor, memory, configuration, operating system, or other factors yet still be similar, coherent and consistent with the other machines and with all other similar modifications.

In all of the described instances or embodiments, the supply or the communication of the asset code (such as class code or object code) to the machines M1, M2 . . . Mn and optionally inclusive of a machine X, can be branched, distributed or communication among and between the different machines in any combination or permutation; such as by providing direct machine to machine communication (for example, M2 supplies each of M1, M3, M4 etc. directly), or by providing or using cascaded or sequential communication (for example, M2 supplies M1 which then supplies M3 which then supplies M4, and so on) or a combination of the direct and cascaded and/or sequential.

The above described arrangement needs to be varied in the situation where the modification relates to a cleanup routine, finalization or similar, which is only to be carried out by one of the plurality of computers In this variation of this "master/slave" or "primary/secondary" arrangement, machine M2 loads the asset (such as class or object) inclusive of a cleanup routine in unmodified form on machine M2, and then (for example, M2 or each local machine) deletes the unmodified cleanup routine that had been present on the machine in whole or part from the asset (such as class or object) and loads by means of the computer communications network the modified code for the asset with the now modified or deleted cleanup routine on the other machines. Thus in this instance the modification is not a transformation, instrumentation, translation or compilation of the asset cleanup routine but a deletion of the cleanup routine on all machines except one. In one embodiment, the actual code-block of the finalization or cleanup routine is deleted on all machines except one, and this last machine therefore is the only machine that can execute the finalization routine because all other machines have deleted the finalization routine. One benefit of this approach is that no conflict arises between multiple machines executing the same finalization routine because only one machine has the routine.

The process of deleting the cleanup routine in its entirety can either be performed by the "master" machine (such as for example machine M2 or some other machine such as machine X) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally the server machine X.

In a further arrangement, a particular machine, say for example machine M1, loads the unmodified asset (such as class or object) inclusive of a finalization or cleanup routine and all the other machines M2, M3 . . . Mn perform a modification to delete the cleanup routine of the asset (such as class or object) and load the modified version.

In a still further arrangement, the machines M1, M2 . . . Mn, may send some or all load requests to the additional server machine X, which performs the modification to the application program code 50 (including or consisting of assets, and/or classes, and/or objects) and inclusive of finalization or cleanup routine(s), via any of the above-mentioned methods, and returns in the modified application program code inclusive of the now modified finalization or cleanup routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalization or cleanup routine(s) to each machine. The modifications performed by machine X can include any of the modifications described. This arrangement may of course be applied to some only of the machines whilst other arrangements described herein are applied to others of the machines.

Those skilled in the computer and/or programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are properly handled or catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated languages) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, and the like. In at least one embodiment of the invention, any one or each of these various means may be implemented by computer program code statements or instructions (possibly including by a plurality of computer program code statements or instructions) that execute within computer logic circuits, processors, ASICs, logic or electronic circuit hardware, microprocessors, microcontrollers or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the above described methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore include a computer program product comprising a set of program instructions stored in a storage medium or existing electronically in any form and operable to permit a plurality of computers to carry out any of the methods, procedures, routines, or the like as described herein including in any of the claims.

Furthermore, the invention includes (but is not limited to) a plurality of computers, or a single computer adapted to interact with a plurality of computers, interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system The term "compromising" (and its grammatical variations) as used herein is used in the inclusive sense of "having" or "including" and not in the exclusive sense of "consisting only of".

To summarise, there is provided an improved method used in a multiple computer environment in which different portions of at least one application program each written to execute on only a single computer, each execute substantially simultaneously on a corresponding one of a plurality of computers, each having a local memory and each being interconnected via a communications network, and in which at least one memory location is replicated in the memory of each the plurality of computers, and after each occasion at which each the memory location has its contents written to, or re-written, with a new content, all the corresponding memory locations of the computers are in due course updated via the communications network with the new content, the improved method comprising the steps of:

(i) prior to initially writing the new content, acquiring a lock on an object, asset or resource, (ii) recording the name and updated content of the local memory locations written to prior to releasing the lock, (iii) releasing the lock, and (iv) prior to permitting the acquisition of the same lock by another one of the computers, transmitting the updated memory location(s) and updated content(s) to the another one computer, whereby any the computer on acquiring the lock has acquired the previously updated contents without needing to wait for the in due course updating of all the computers.

Preferably each the computer has an independent local memory accessible only by the corresponding portion of the application program.

Preferably the object, asset or resource locked is the object, asset or resource to which the new content is to be written.

Preferably the method includes the further step of:

(v) transmitting in step (iv) all memory locations and contents updated in step (ii).

Alternatively the method includes the further step of:

(vi) transmitting in step (iv) all memory locations and only their final contents as updated in step (ii).

Preferably the method includes the further steps of:

(vii) prior to acquiring the lock, detecting all applications program steps which potentially write to listed memory location(s), and (viii) recording the name of the listed memory location(s) prior to releasing the lock.

Preferably the detecting all application program steps takes place either before loading, or during loading, or after loading but before execution of the relevant code.

Preferably the recording of the name of the listed memory locations takes place either at the time of detection or at the time of execution of a detected program step.

Preferably the method includes the further step of:

(ix) for each recorded memory location recording all contents updated in step (ii).

Alternatively the method includes the further step of:

(x) for each recorded memory location recording only the final contents as updated in step (ii).

Also provided is a computer system comprising a plurality of computers each having a local memory and each being interconnected via a communications network wherein different portions of at least one application program each written to execute on only a single computer, each execute substantially simultaneously on a corresponding one of the plurality of computers, at least one memory location is replicated in the local memory of each the computer, the system further comprising updating means associated with each the computer to in due course update each the memory location via the communications network after each occasion at which each the memory location has its content written to, or re-written, with a new content, and lock means associated with each the computer to acquire a lock on an object, asset or resource, the lock means including a recording means in which is recorded the name and updated content of all the local memory locations written to prior to releasing the lock, and the lock means after releasing the lock and prior to permitting the acquisition of the same lock by another one of the computers transmitting the updated memory location(s) and updated content(s) to the another one computer, whereby any the computer on acquiring the lock has acquired the previously updated contents without needing to wait for the in due course updating of all the computers.

Preferably each the computer has an independent local memory accessible only by the corresponding portion of the application program.

Preferably the object, asset or resource locked is the object asset or resource to which the new content is written.

Preferably the lock means comprises a lock server computer in addition to the plurality of computers, and also connected to the plurality of computers via the communications network.

Preferably the recording means comprises a look up table.

Preferably the look up table includes all contents updated for each recorded memory location.

Preferably the look up table includes only the final content of each updated content for each recorded memory location.

Preferably the contents of the look up table comprises the address of a memory location at which the updated content is stored.

Further, also provided are a plurality of computers interconnected via a communications network and operable to ensure carrying out of the above method(s).

In addition, there is provided a computer program product comprising a set of program instructions stored in a storage medium and operable to permit a plurality of computers to carry out the any of the above method(s).

Furthermore, there is also provided a single computer intended to operate in a multiple computer system which comprises a plurality of computers each having a local memory and each being interconnected via a communications network wherein different portions of at least one application program each written to execute on only a single computer, each execute substantially simultaneously on a corresponding one of the plurality of computers, and at least one memory location is replicated in the local memory of each the computer, the system further comprising updating means associated with each the computer to in due course update each the memory location via the communications network after each occasion at which each the memory loca tion has its content written to, or re-written, with a new content, the single computer comprising:

a local memory having at least one memory location intended to be updated via a communications port connectable to the communications network, updating means to in due course update the memory locations of other substantially similar computers via the communications port;

lock means associated with the local memory to acquire a lock on an object, asset or resource of the local memory, the lock means including a recording means in which is recorded the name and updated content of the local memory locations written to prior to releasing the lock, and the lock means after releasing the lock and prior to permitting the acquisition of the same lock by another one of the computers, transferring the updated memory location(s) and updated content(s) to the communications port for transmittal to the another one computer whereby any the another one computer on acquiring the lock has acquired the previously updated contents without needing to wait for the in due course updating of all the computers.

Preferably the local memory is an independent local memory accessible only by the corresponding portion of the application program executing on the computer.

Preferably the object, asset or resource locked is the object, asset or resource to which the new content is written.

Preferably the lock means further includes a lock server computer connectable to the single computer via the communications network.

Preferably the recording means comprises a look up table.

Preferably the look up table includes all contents updated for each recorded memory location.

Alternatively the look up table includes only the final content of each updated content for each recorded memory location.

Preferably the contents of the look up table comprises the address of a memory location at which the updated content is stored.

Still further, there is provided in a single computer, adapted to interoperate with a plurality of other external computers as a multiple computer system wherein the computer has a local processor and a local memory coupled to the local processor and the computers are at least intermittently interconnected via a communications network, and wherein different portions of an application program written to execute on only a one computer are modified to execute substantially simultaneously on the single computer and the plurality of computers, and wherein at least one memory location is replicated in the local memory of each the computer, each the computer including memory location updating means to in due course update each the memory location via the communications network after each occasion at which each the memory location has its content written to, or re-written, with a new content; a method comprising:

acquiring a lock on an object, asset, or resource of the local memory of the single computer prior to initially writing the new content;

recording the name and updated content of the at least one local memory location of the single computer written to prior to releasing the lock;

releasing the lock on the object, asset, or resource of the local memory of the single computer; and sending a communication of the updated memory location(s) and updated content(s) to other of the plurality of computers by the single computer over the communications network.

Preferably the method further comprises:

permitting but not requiring the acquisition of a new lock on the same object, asset, or resource by another one of the computers;

wherein any the another one of the plurality of computers on acquiring the new lock has acquired the previously updated memory location contents without needing to wait for the in due course updating of the updated contents of all the plurality of computers.

Preferably the method further comprises:

updating the local memory locations of other of the plurality of computers via the communications network in due course.

Preferably the method further comprises:

generating a memory update message that includes the updated memory locations(s) and updated content(s) that are to be updated in due course in other of the computers, prior to sending the communication and sending the generated memory update message with the communication.

Also provided is a computer program product comprising a set of program instructions stored in a storage medium and operable to permit a computer to carry out the above method(s).

In addition there is provided in a single computer, adapted to interoperate with a plurality of other external computers as a multiple computer system wherein the computer has a local processor and a local memory coupled to the local processor and the computers are at least intermittently interconnected via a communications network, and wherein different portions of an application program written to execute on only a one computer are modified to execute substantially simultaneously on the single computer and the plurality of computers, and wherein at least one memory location is replicated in the local memory of each the computer, each the computer including memory location updating means to in due course update each the memory location via the communications network after each occasion at which each the memory location has its content written to, or re-written, with a new content; a method comprising: receiving a communication of updated memory location(s) and updated content(s) to send by a different one of the plurality of computers by the single computer over the communications network; and updating the local memory locations of the single computer in response to the received communication.

Preferably the communication received includes a memory update message that includes the updated memory locations(s) and updated content(s) that are to be updated in due course in the receiving computer.

Still further, there is provided a computer program product comprising a set of program instructions stored in a storage medium and operable to permit a computer to carry out the last mentioned method.

COPYRIGHT NOTICE

This patent specification and the Annexures which form a part thereof contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific prior written approval of the copyright owner.

The invention claimed is:

1. A method carried out in a multiple computer system comprising a plurality of machines each including a processor and a local memory coupled with the processor including a first machine and a second machine interconnected via a communications link or network operating in a replicated shared memory arrangement, the method comprising:
   a. acquiring a lock on the first machine having a replicated memory location;
   b. recording an identifier of the replicated memory location written-to with an updated content prior to releasing said lock on the first machine;
   c. releasing said lock on the first machine; and
   d. prior to permitting an operation of the lock by the second machine, or prior to said second machine acquiring the lock, transmitting the recorded identifier and the updated content to said second machine.

2. A method as in claim 1, wherein the transmitting of the recorded identifier and the updated content to said second machine is performed so that said second machine upon operating on said lock has already received said updated content.

3. A method as in claim 2, wherein the step (d) of transmitting of the recorded identifier and the updated content to said second machine is performed as part of in due course updating so that said second machine upon operating on said lock has already received said updated content comprises transmitting the recorded identifier and contents of the written-to the replicated memory location of step (b) to the second machine.

4. A method as in claim 3, wherein said in due course updating includes updating replicated memory locations so that they are updated to remain substantially similar upon occasion of any one of said plurality of machines simultaneously operating an application program causing modification of the contents of said replicated memory location.

5. A method as in claim 3, wherein the transmitting of step (d) comprises transmitting only the final content of each written-to memory location of step (b).

6. A method as in claim 3, wherein the transmitting of step (d) comprises transmitting all updated contents of each written-to memory location including a final updated content and an intermediary changed content.

7. A method as in claim 1, wherein the transmitting of the recorded identifier and the updated content to said second machine is performed so that said second machine upon operating on said lock has already received said updated content without waiting for ordinary updating of said written-to replicated memory location of all said plurality of machines.

8. A method as in claim 7, wherein the lock is a lock for an object, an asset, or a resource on the first machine.

9. A method as in claim 8, wherein the lock comprises a replicated lock.

10. A method as in claim 8, wherein:
   the lock is a lock for an object, an asset, or a resource on the first machine and said first machine comprises a computer;
   the updated content comprises an updated value or updated values;
   the identifier comprises a name or an identity or an address;
   said prior to permitting operation of the lock further comprises prior to permitting acquisition of the lock;
   said prior to said second machine acquiring the lock comprises at least one of: (i) prior to permitting acquisition or operation of the lock; (ii) prior to permitting acquisition or operation of the same lock on said object, asset, or resource; and (iii) prior to permitting acquisition or operation of a corresponding replicated lock on an object, asset, or resource.

11. A method as in claim 7, wherein an acquired lock comprises an acquired lock on an object, asset, or resource.

12. A method as in claim 8, wherein an object, asset, or resource is the object, asset, or resource to which said updated content is to be written.

13. A method as in claim 7, wherein said first machine comprises a computer.

14. A method as in claim 7, wherein the updated content comprises an updated value or updated values.

15. A method as in claim 7, wherein the identifier comprises a name or an identity or an address.

16. A method as in claim 7, wherein said prior to said second machine acquiring the lock comprises prior to permitting acquisition or operation of the lock.

17. A method as in claim 16, wherein the prior to permitting operation of the lock further comprises prior to permitting acquisition of the lock.

18. A method as in claim 7, wherein said prior to said second machine acquiring the lock comprises prior to permitting acquisition or operation of the same lock on an object, asset, or resource.

19. A method as in claim 7, wherein said prior to said second machine acquiring the lock comprises prior to permitting acquisition or operation of a corresponding replicated lock on an object, asset, or resource.

20. A method as in claim 1, wherein:
   the lock comprises a replicated lock for an object, an asset, or a resource on the first machine;
   prior to acquiring the lock permitting acquisition or operation of a corresponding replicated lock on said object, asset, or resource;
   the transmitting of the recorded identifier and the updated content to said second machine is performed so that said second machine upon operating on said lock has already received said updated content without waiting for ordinary updating of said written-to replicated memory location.

21. A method as in claim 20, wherein the transmitting of step (d) comprises transmitting only the final content of each written-to memory location of step (b).

22. A method as in claim 20, wherein the transmitting of step (d) comprises transmitting all updated contents of each written-to memory location including a final updated content and an intermediary changed content.

23. A method as in claim 20, wherein in the transmitting of step (d), the prior to permitting operation of the lock by the second machine includes, requiring said second machine to receive the transmitted identifier and content of the written-to replicated memory location transmitted by the first machine, and to have updated content of corresponding identified local replicated memory locations of the second machine with the updated content of the received transmissions of the first machine.

24. A method as in claim 1, wherein the transmitting of step (d) comprises transmitting only the final content of each written-to memory location of step (b).

25. A method as in claim 1, wherein the transmitting of step (d) comprises transmitting all of the updated contents of each written-to memory location including a final updated content and an intermediary changed content.

26. A method as in claim 1, wherein in the transmitting of step (d), the prior to permitting operation of the lock by the second machine includes, requiring said second machine to receive the transmitted identifier and content of the written-to replicated memory location transmitted by the first machine, and to have updated the content of corresponding identified local replicated memory locations of the second machine with the updated content of the received transmissions of the first machine.

27. A method as in claim 1, wherein the transmission of step (d) is transmitted at a higher priority than a lower priority for in due course transmissions where updating includes updating replicated memory locations so that they are updated to remain substantially similar upon occasion of any one of said plurality of machines simultaneously operating an application program causing modification of the content of said replicated memory location of step (a).

28. A method as in claim 1, wherein the transmissions of step (d) and in due course transmissions are a single transmission and not two independent transmissions.

29. A method as in claim 1, wherein the transmissions of step (d) are sent to two or more machines.

30. A method as in claim 29, further including the further step of: plural machines receiving the transmissions of step (d) and updating identified local replicated memory locations with received corresponding updated content.

31. A method as in claim 1, wherein the local memory of each said plurality of machines are independent of each other machine.

32. A method as in claim 1, each of said processor of each said plurality of machines may only access the local memory of the same machine.

33. A method as in claim 1, wherein at least a first application program written to operate on a single one of said plurality of machines, is operating substantially simultaneously on different ones of said plurality of machines.

34. A method as in claim 1, wherein an application program operating substantially simultaneously on each of said different ones of said plurality of machines may only access the local memory of the same machine.

35. A method as in claim 34, wherein said access is satisfied by the local memory of the same machine independently of and without the aid of the local memories of any other machine.

36. A method as in claim 35, wherein said access includes (or is restricted to) reading and/or writing content resident within said local memory of the same machine.

37. A method as in claim 35, wherein said access includes (or is restricted to) reading and/or writing content of real or virtual memory addresses resident within said local memory of the same machine.

38. A method as in claim 35, wherein said access is restricted to reading and/or writing content resident within said local memory of the same machine.

39. A method as in claim 35, wherein said access is restricted to reading and/or writing content of real or virtual memory addresses resident within said local memory of the same machine.

40. A method as in claim 34, wherein at least one memory location and/or memory content of said application program is substantially similarly replicated in said local memories of said plurality of machines.

41. A method as in claim 40, wherein said at least one substantially similarly replicated memory location and/or memory content are stored non-identically in said local memories of said different ones of said plurality of machines.

42. A method as in claim 41, wherein said at least one substantially similarly replicated memory location and/or memory content are updated in due course to remain substantially similar upon occasion of any one of said plurality of machines simultaneously operating said application program modifying, or causing to be modified, the content of said at least one substantially similarly replicated memory location and/or memory content.

43. A method as in claim 1, wherein:
said local memory of each said plurality of machines are independent of local memory of each other machine;
said processor of each said plurality of machines may only read said local memory of the same machine in which the processor is located;
at least a first application program written to operate on a single one of said plurality of machines, is operating substantially simultaneously on different ones of said plurality of machines;
said application program operating substantially simultaneously on each of said different ones of said plurality of machines, may only access said local memory of the same machine;
said access of said application program is satisfied by said local memory of the same machine independently of or without the aid of said local memory of any other machine;
said access of said application program includes reading and/or writing content or values stored or resident within said local memory of the same machine, or said access of said application program is restricted to reading and/or writing content or values stored or resident within said local memory of the same machine;
said access of said application program includes reading and/or writing content or values of real or virtual memory addresses of or resident within said local memory of the same machine, or said access of said application program is restricted to reading and/or writing content or values of real or virtual memory addresses of or resident within said local memory of the same machine;
at least one memory location and/or memory value of said application program is substantially similarly replicated in said local memory of each of said different ones of said plurality of machines; said at least one substantially similarly replicated memory location and/or value are stored non-identically in said local memory of each of said plurality of machines;
said substantially similarly replicated memory location and/or memory value are updated through in-due-course updating to remain substantially similar upon occasion of any one of said plurality of machines simultaneously operating said first application program modifying, or causing to be modified, content of said substantially similarly replicated memory location and/or memory value; and
said in-due-course updating provides that said at least one replicated memory location is updated to remain substantially similar upon occasion of any one of said plurality of machines simultaneously operating said application program causing modification of the content of said at least one replicated memory location.

44. An article of manufacture comprising a non-transitory computer readable memory device containing computer-readable instructions therein which, when executed, carry out a method in at least one single computer capable of interoperating with at least one other computer coupled to at least one said single computer at least intermittently via a communications network to form a multiple computer system having a plurality of computers, wherein each computer of the multiple computer system has a local memory and the multiple computer system operating in a replicated shared memory arrangement, the method comprising:
a. acquiring a lock on a first machine having a replicated memory location;

b. recording an identifier of the replicated memory location written-to with an updated content prior to releasing said lock on the first machine;
c. releasing said lock on the first machine; and
d. prior to permitting an operation of the lock by a second machine, transmitting the recorded identifier and the updated content to said second machine.

45. A multiple computer system comprising:
a plurality of computers each including a processor and a local memory coupled with the processor including a first computer and a second computer interconnected via a communications link or network operating in a replicated shared memory arrangement;
means for acquiring a lock on the first computer having a replicated memory location;
means for recording an identifier of the replicated memory location written-to with an updated content prior to releasing said lock on the first computer;
means for releasing said lock on the first computer; and
means for transmitting, prior to permitting an operation of the lock by the second computer, the recorded identifier and the updated content to said second computer.

46. A method carried out in a single computer that operates in a multiple computer system comprising a plurality of computers each having a local processor and a local memory coupled to the local processor, and each of the plurality of computers being interconnected via a communications network, and operating in a replicated shared memory arrangement, the method comprising:
acquiring a lock;
recording an identifier of a replicated memory location written-to with an updated content prior to releasing said lock;
releasing said lock; and
communicating, prior to permitting an operation of the lock, the recorded identifier and the updated content.

47. A single computer intended to operate in a multiple computer system which comprises a plurality of computers each having a local processor and a local memory coupled to the local processor, and each of the plurality of computers being interconnected via a communications network, and operating in a replicated shared memory arrangement, the single computer comprising:
means for acquiring a lock;
means for recording an identifier of a replicated memory location written-to with an updated content prior to releasing said lock;
means for releasing said lock; and
means for communicating, prior to permitting an operation of the lock, the recorded identifier and the updated content.

* * * * *